(12) United States Patent
Queveau et al.

(10) Patent No.: US 7,278,676 B2
(45) Date of Patent: Oct. 9, 2007

(54) RETRACTABLE ROOF FOR A VEHICLE

(75) Inventors: Gérard Queveau, Le Pin (FR);
Jean-Marc Guillez, Cirieres (FR); Paul Queveau, Montravers (FR)

(73) Assignee: SEBA - Societe Europeene de Brevets Automobiles, Paris (FR)

( * ) Notice: Subject to any disclaimer, the term of this patent is extended or adjusted under 35 U.S.C. 154(b) by 0 days.

(21) Appl. No.: 10/545,196

(22) PCT Filed: Feb. 9, 2004

(86) PCT No.: PCT/FR2004/000292

§ 371 (c)(1),
(2), (4) Date: Aug. 10, 2005

(87) PCT Pub. No.: WO2004/082972

PCT Pub. Date: Sep. 30, 2004

(65) Prior Publication Data

US 2006/0071502 A1    Apr. 6, 2006

(30) Foreign Application Priority Data

Feb. 28, 2003 (FR) .................................. 03 02486

(51) Int. Cl.
*B60J 7/00* (2006.01)
(52) U.S. Cl. .................................................. 296/107.2
(58) Field of Classification Search ...................... None
See application file for complete search history.

(56) References Cited

U.S. PATENT DOCUMENTS

| 6,830,282 | B2* | 12/2004 | Guillez et al. ......... 296/107.08 |
| 6,860,541 | B2* | 3/2005 | Guillez et al. ......... 296/107.18 |
| 6,921,124 | B2* | 7/2005 | Guillez et al. ............. 296/108 |
| 2004/0041434 | A1* | 3/2004 | Guillez .................... 296/107.2 |
| 2004/0113453 | A1* | 6/2004 | Guillez et al. ........... 296/107.2 |
| 2006/0071502 | A1* | 4/2006 | Queveau et al. ......... 296/107.2 |
| 2006/0131918 | A1* | 6/2006 | Queveau et al. ....... 296/107.01 |
| 2006/0249979 | A1* | 11/2006 | Queveau et al. ....... 296/107.19 |

FOREIGN PATENT DOCUMENTS

| EP | 0 764 553 A1 | 3/1997 |
| FR | 2 814 404 A1 | 3/2002 |
| FR | 2 819 757 A1 | 7/2002 |
| FR | 2 828 137 A1 | 2/2003 |

* cited by examiner

*Primary Examiner*—H Gutman
(74) *Attorney, Agent, or Firm*—Nawrocki, Rooney & Sivertson, P.A.

(57) ABSTRACT

The invention relates to a retractable roof for a vehicle, comprising a rigid front roof element (5) and a rigid rear roof element (4). It comprises a rear roof element at the rear roof thereof, guided by a first sliding rail (8) which is connected to the structure (1) of the vehicle and the front part thereof which is coupled to a second sliding rail (13) cooperating with a manoevring arm (10) which is coupled to the structure of the vehicle and which is actuated by drive means (9); a rigid element (18) connects the rear part of the rear roof element; the rear part of the front roof element is guided by a third sliding rail and the front part is coupled to the arm; means (21-23) are provided to cause the front roof element to slide on the third sliding rail.

5 Claims, 7 Drawing Sheets

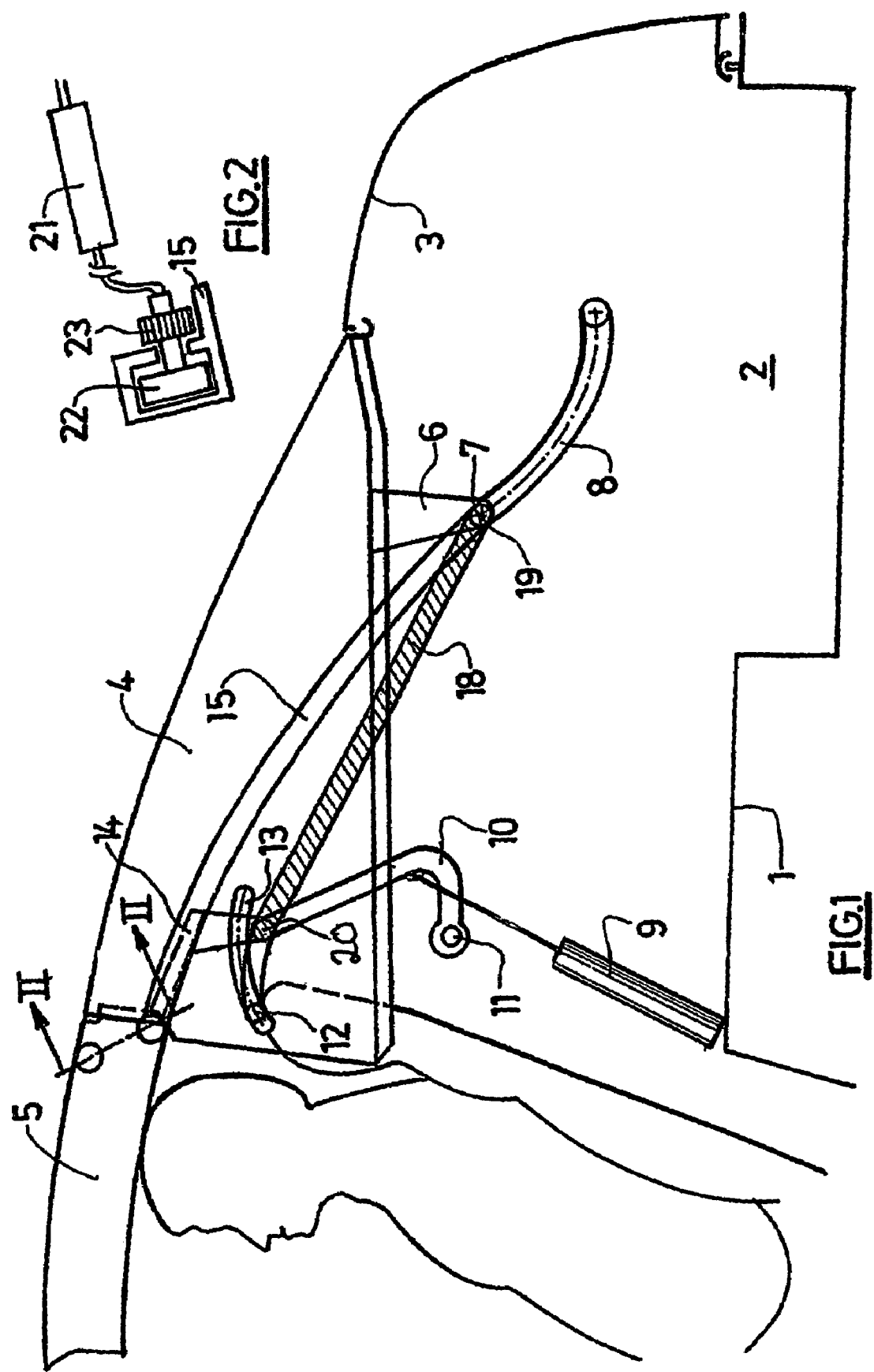

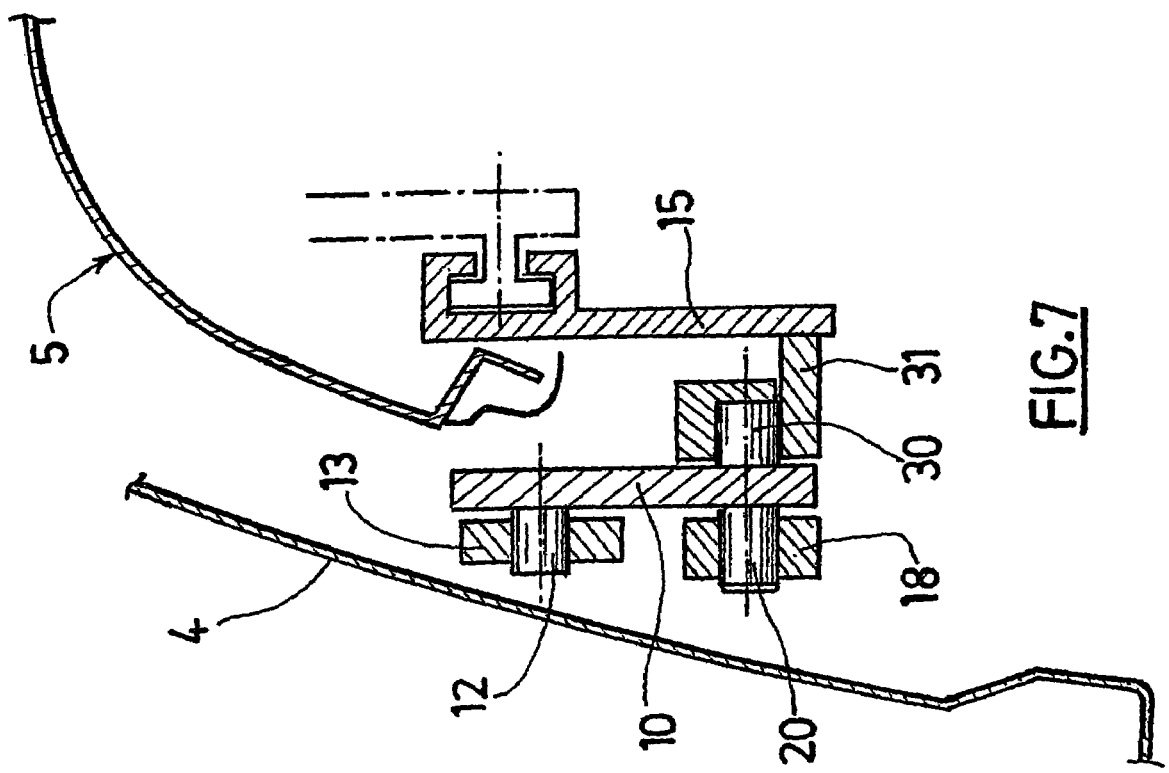

RETRACTABLE ROOF FOR A VEHICLE

CROSS-REFERENCE TO RELATED APPLICATIONS

This application claims priority of PCT/FR2004/000292 filed on Feb. 9, 2004, which claims priority of French Patent Application No. 03/02486, filed Feb. 28, 2003.

BACKGROUND OF THE INVENTION

The present invention relates to a retractable vehicle roof, and more particularly to such a roof comprising a front roof element and a rear roof element that are rigid and movable between a position in which they cover the passenger compartment of the vehicle and a position in which they are stowed in the rear trunk of the vehicle.

Such a retractable roof makes it possible to transform a vehicle of the saloon or coupe type into a vehicle of the cabriolet type.

SUMMARY OF THE INVENTION

FR-A-2 828 137 discloses a retractable roof whose rear element is received vertically at the front of the rear trunk, and whose front element is received horizontally in the trunk. Unfortunately, the arrangement described is not applicable when the length of the rear element is greater than the height of the trunk.

Besides, no means are provided for stowing the front element of the roof in the rear trunk while also maintaining the rear element in the covering position.

An object of the present invention is to mitigate those drawbacks.

More particularly, an object of the invention is to provide a roof that is retractable into a rear trunk that is of relatively low height.

Another object of the invention is to provide a retractable roof whose rear element can remain in place while the front element is stowed in the rear trunk.

A further object of the invention is to provide a retractable roof which can be stowed and deployed without needing the rear trunk to be opened, it then being possible for the rear trunk to be a trunk that opens from the rear forwards only.

To this end, the invention provides a retractable vehicle roof, comprising a front roof element and a rear roof element that are rigid and movable between a position in which they cover the passenger compartment of the vehicle and a position in which they are stowed in the rear trunk of the vehicle, said retractable roof being characterized in that:

- the rear roof element has its rear portion guided by a first runner that is secured to the structure of the vehicle or to the rear roof element, and has its front portion secured to a second runner co-operating with a drive arm hinged to the structure of the vehicle and actuated by drive means;
- a rigid member connects said arm to the rear portion of the rear roof element;
- the front roof element has its rear portion guided by a third runner whose rear portion is guided in said first runner and whose front portion is hinged to said arm; and
- means are provided for causing the front roof element to slide on said third runner.

In a particular embodiment, the retractable roof of the invention further comprises locking means for locking said second runner on said drive arm.

More particularly, said locking means comprise a hook mounted on said second runner and arranged to lock a finger integral with or secured to said arm with a lug integral with or secured to said runner, and means for actuating said hook.

Also in a particular embodiment, the retractable roof of the invention further comprises means for unlocking said second runner from said drive arm, and for locking said second runner to the structure of the vehicle, when the roof elements are stowed in the rear trunk of the vehicle.

It is thus possible to bring the rear element of the roof into the covering position while leaving the front element stowed in the rear trunk of the vehicle.

More particularly, the means for actuating said hook may be arranged to lock said hook to the structure of the vehicle and to prevent the third runner from moving relative to the first runner.

BRIEF DESCRIPTION OF THE DRAWINGS

A particular embodiment of the invention is described below by way of non-limiting example and with reference to the accompanying diagrammatic drawings, in which:

FIG. 1 is a side view of a roof of the invention, shown in the covering position;

FIG. 2 is a larger-scale view in section along line II-II of FIG. 1;

FIG. 7 is a view in section along line VII-VII of FIG. 6;

FIG. 8 is a view in section along line VIII-VIII of FIG. 6;

DETAILED DESCRIPTION OF THE INVENTION

Figure 3:
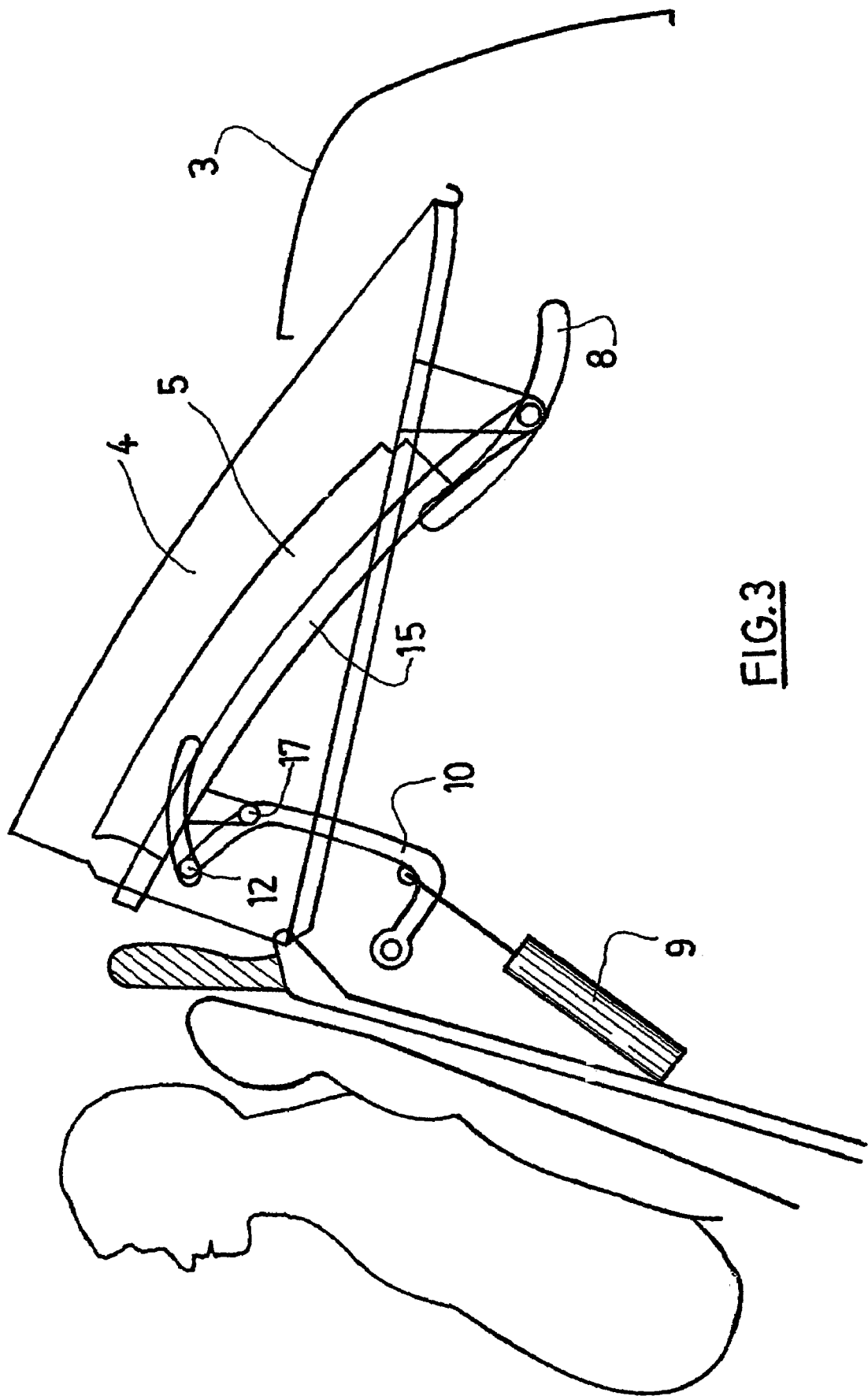
FIG. 3 is a view similar to the FIG. 1 view, with the roof being shown in the process of being stowed away.

FIG. 1 shows the structure 1 of a vehicle, the rear trunk 2 thereof as provided with its lid 3, and the roof in two portions, namely a rear portion 4 and a front portion 5.

The mechanism that is described below is substantially symmetrical about the midplane of the vehicle. Therefore, only one of its sides is described below.

At its rear portion, the rear portion 4 supports brackets 6, on each of which a guide finger 7 is mounted. The guide finger co-operates with a runner 8 secured to the structure of the vehicle.

In addition, the rear portion 4 is actuated by an actuator 9 via an arm 10. The arm 10 has one of its ends hinged to the structure of the vehicle about a transverse axis 11, and its other end is provided with a finger 12 engaged in a runner 13 that is secured to the rear element 4.

The front portion 5 is mounted to slide via its extension 14 in a runner 15.

Figure 9:
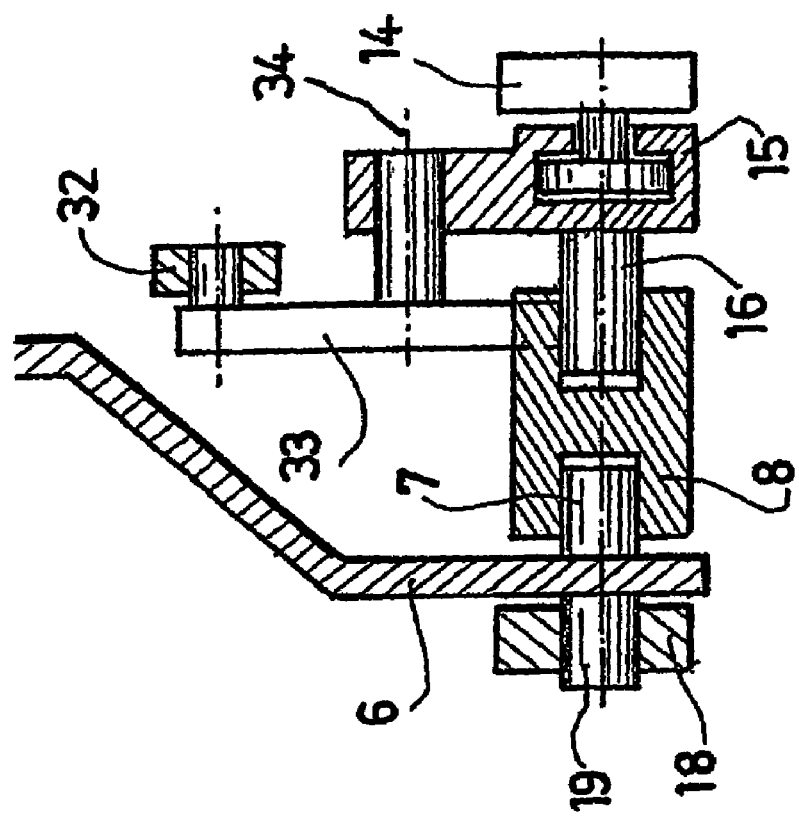
FIG. 9 is a view in section along line IX-IX of FIG. 6.

The runner 15 has its rear portion guided by a guide finger 16 engaged in a second groove in the runner 8 (FIG. 9). The front end of the runner 15 is connected to the arm 10 at a midpoint thereof via a pin having a transverse axis 17 for the purpose of retracting the runner 15 into the trunk of the vehicle at the same time as the rear roof element 4 is being retracted into said trunk.

A rigid rod 18 has its rear end connected to the bracket 6 via a pin having an axis 19. The other end of the rod 18 is connected to the arm 10 in a midplane thereof via a pin having a transverse axis 20.

The rod 18 thus makes it possible to keep a constant gap between the arm 10 and the rear of the rear roof portion 4. The rod also drives the rear roof element 4 when said rod is pushed by the arm 10.

As shown in FIG. 2, the front roof element 5 is driven on the runner 15 by means of a motor 21 that is secured to the element 5. To this end, a finger 22 guides the element 5 in the runner 15, and a rack system 23 that is secured to the finger 22 and that is driven by the motor 21 makes it possible to actuate the element 5 in the runner 15.

A hook 25 is mounted to slide at 26 on the runner 15. The hook 25 is suitable for locking onto a finger 27 that is secured to a part 28 which is itself secured to the structure of the vehicle (FIG. 8).

The hook 25 is actuated by a motor 29 that is secured to the runner 15, and it is suitable for sliding in the longitudinal direction of the vehicle on the member 30.

The arm 10 is also provided with a member 30 that is suitable for coming into abutment on a lug 31 that is secured to or integral with the slide 15 (FIG. 7)

Figure 10:
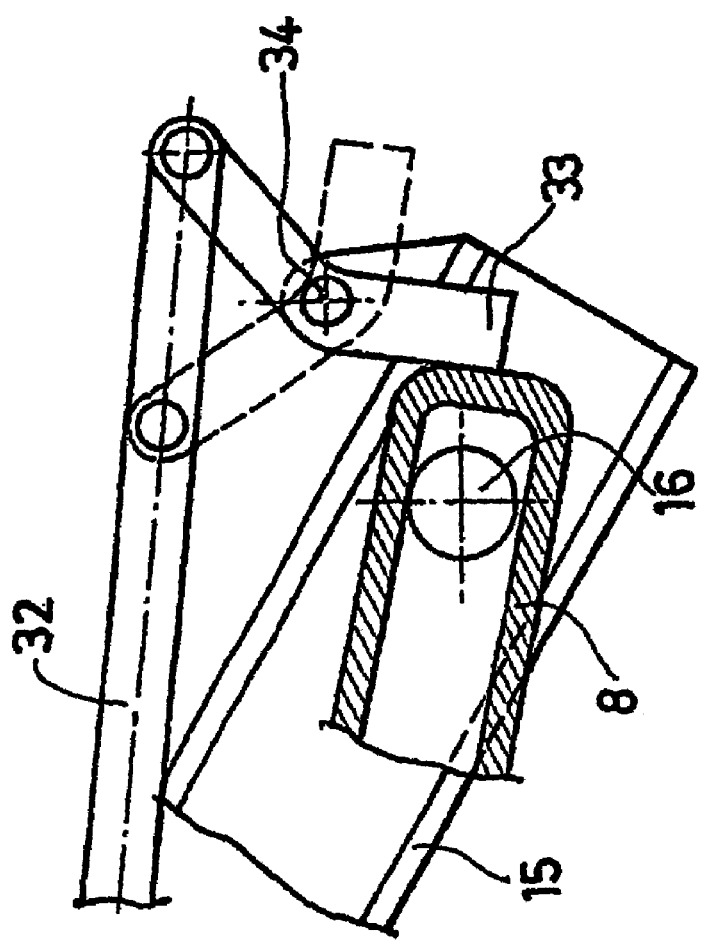
FIG. 10 is a larger-scale view of the detail X of FIG. 6.

At the end opposite the end on which the hook 25 is disposed, the motor 29 actuates a rod 32 connected to a link 33. The link 33 is hinged to the rear end of the runner 15 about a transverse axis 34 (FIG. 10).

When the roof is in the closed position, above the passenger compartment of the vehicle, the front element 5 of the roof is locked onto to the arm 10 via the runner 15. The finger 30 is locked between the front edge of the hook 25 and the lug 31. The roof elements are thus locked.

During opening, the front element 5 is driven along the runner 15 by the motor 21. The first stage of opening consists in disengaging the rear edge of the front element 5 from the front edge of the rear element 4. The arm 10 pivots backwards by means of the cylinder 9. This pivoting makes it possible for the front element 5 to engage under the rear element 4, as shown in FIG. 3.

The roof is then driven into the rear trunk by the continued pivoting of the arm 10 which also drives the runner 15. During this movement, the distance between the front roof element 5 and the rear roof element 4 is kept by the runner 13 co-operating with the finger 12.

Figure 4:
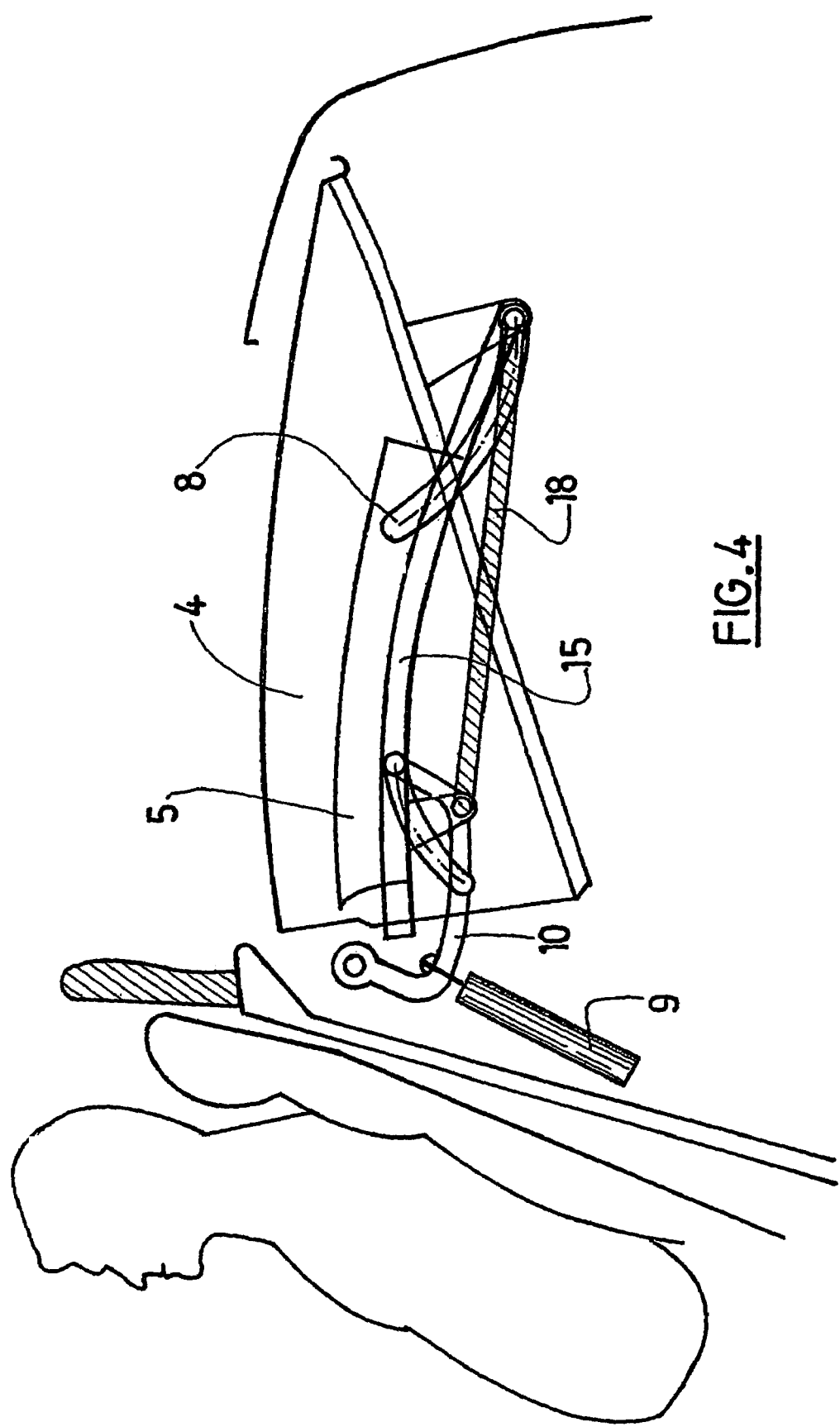
FIG. 4 is a view similar to FIGS. 1 and 3, with the roof being shown in the stowed position.

The roof is then in the configuration shown in FIG. 4. In this configuration, a luggage cover can be fitted and tensioned between the back of the seat and the front edge of the lid 3 of the rear trunk.

When the roof elements are stowed in the rear trunk, the front element 5 and the runner 15 can be unlocked from the rear element 4 so as to be locked to the structure of the vehicle and to the runner 8.

For this purpose, the motor 29 moves the hook 25 backwards, thereby causing the runner 15 to be unlocked from the arm 10. The hook 25 then comes to lock onto the finger 27 which, via the part 28, is secured to the structure of the vehicle.

Besides, the motor 29 actuates the rod 32 and the link 33. The link 33 is thus locked onto the rear edge of the runner 8, thereby preventing the runner 15 from moving along the runner 8.

Figure 5:
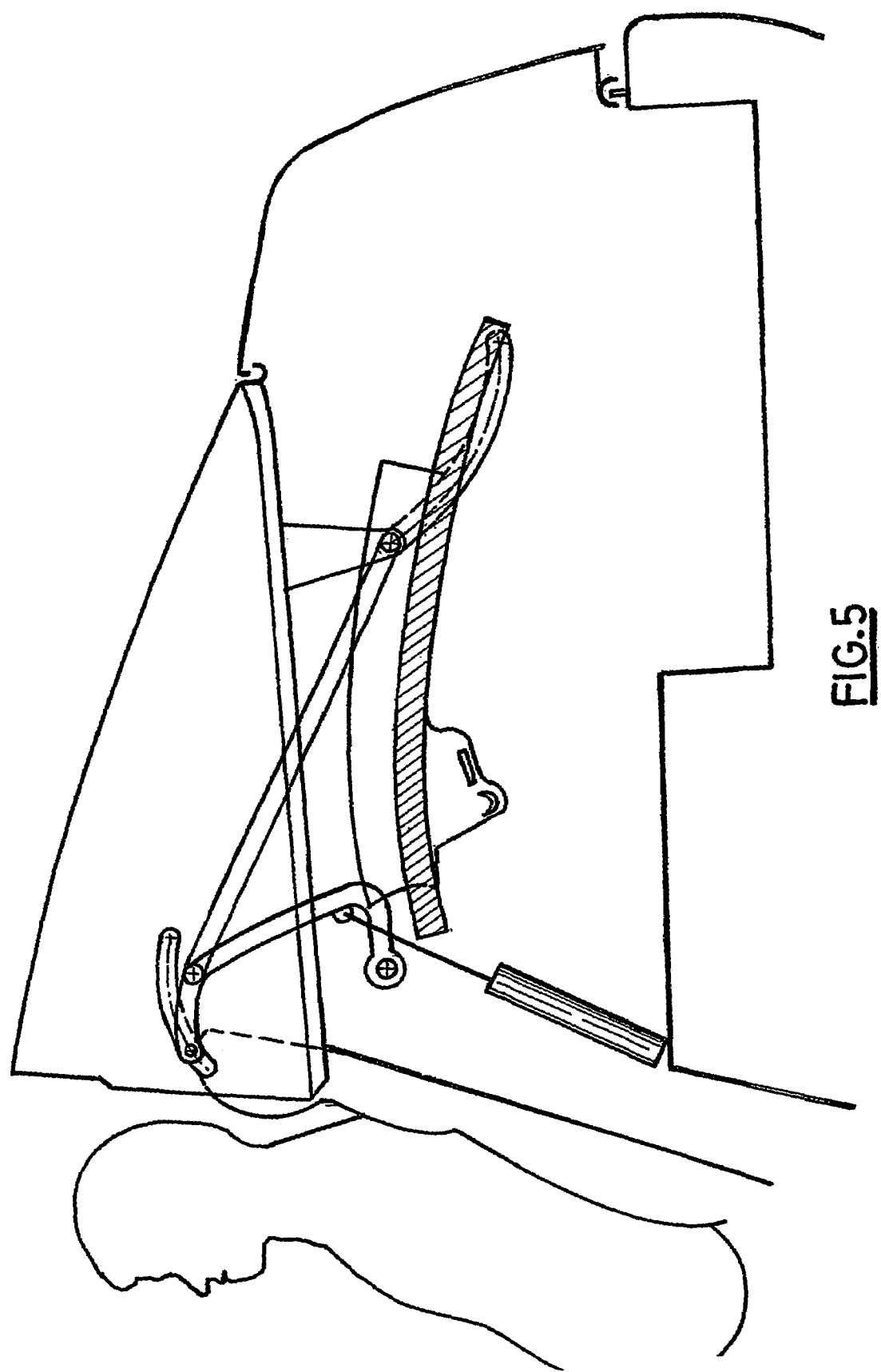
FIG. 5 is a view similar to FIGS. 1, 3, and 4, with the roof being shown partially open.
Figure 6:
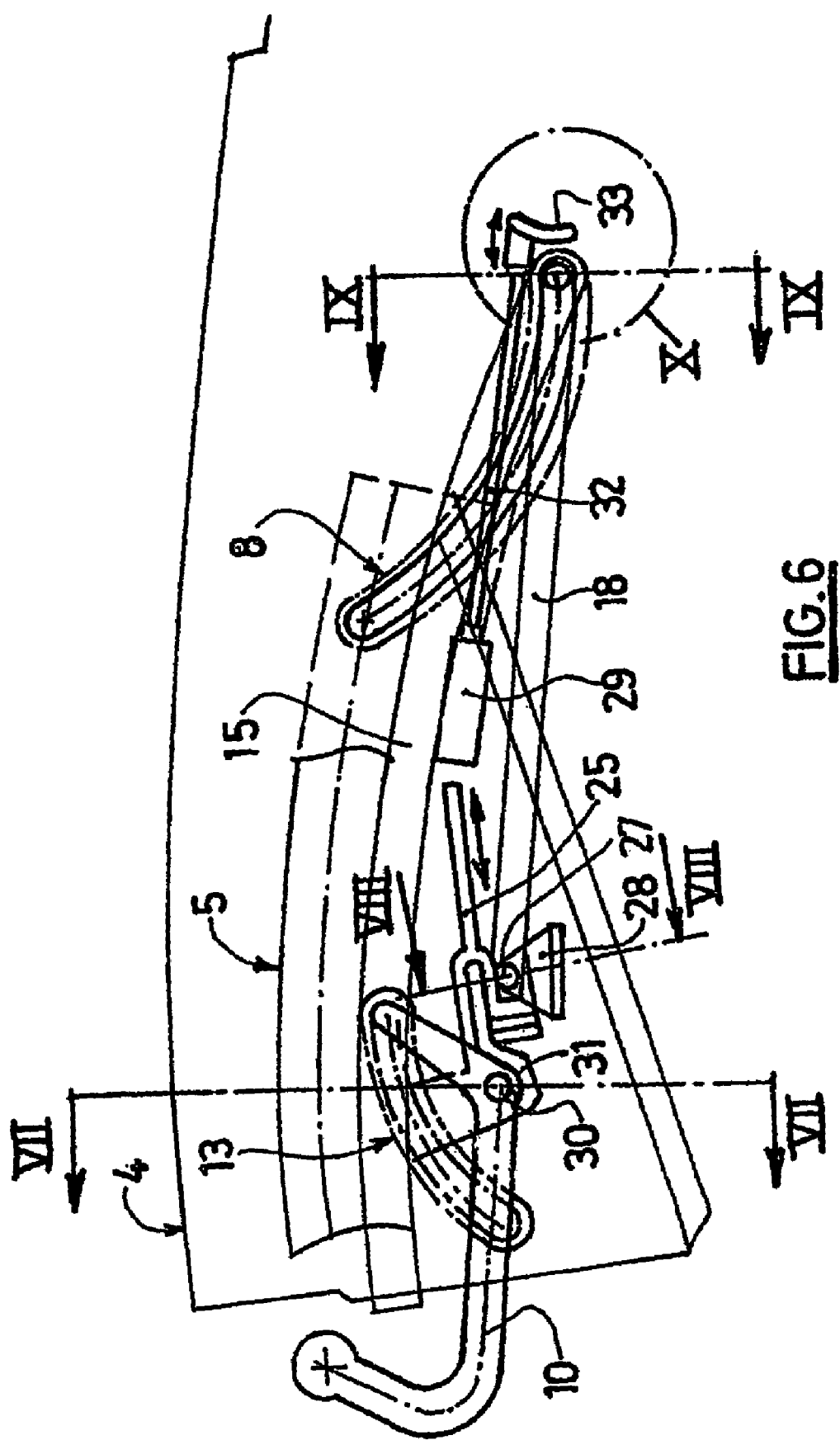
FIG. 6 is a larger-scale view of the mechanism of the roof in its FIG. 4 position.

The rear element 4 of the roof can then go back up into the configuration shown in FIG. 5.

It should be noted that the mechanism described above enables the roof elements to be stowed horizontally in the rear trunk. But it would be equally possible to stow them vertically provided their length does not exceed the height of the trunk.

It should also be noted that the runner for guiding the rear element of the roof could, instead of being secured to said element, equally well be secured to the structure of the vehicle. In which case, said runner would co-operate with the guide fingers secured to or integral with the walls of the rear trunk.

The invention claimed is:

1. A retractable vehicle roof, comprising a front roof element and a rear roof element that are rigid and movable between a position in which they cover the passenger compartment of the vehicle and a position in which they are stowed in the rear trunk of the vehicle, said retractable roof being characterized in that:

the rear roof element has its rear portion guided by a first runner that is secured to the vehicle, and has its front portion secured to a second runner co-operating with a drive arm hinged to the vehicle and actuated by drive means;

a rigid member connects said arm to the rear portion of the rear roof element;

the front roof element has its rear portion guided by a third runner whose rear portion is guided in said first runner and whose front portion is hinged to said arm; and means are provided for causing the front roof element to slide on said third runner.

2. A retractable roof according to claim 1, further comprising locking means for locking said second runner on said drive arm.

3. A retractable roof according to claim 2, in which said locking means comprise a hook and a second runner with the hook mounted on said second runner and arranged to lock a finger integral with or secured to said arm with a lug integral with or secured to said runner, and means for actuating said hook.

4. A retractable roof according to claim 3, in which the means for actuating said hook are arranged to lock said hook to the vehicle and to prevent the second runner from moving relative to the first runner.

5. A retractable roof according to claim 2 further comprising means for unlocking said second runner from said drive arm, and for locking said second runner to the vehicle, when the roof elements are stowed in the rear trunk of the vehicle.

* * * * *